(12) United States Patent
Johnson et al.

(10) Patent No.: US 7,362,840 B2
(45) Date of Patent: Apr. 22, 2008

(54) CIRCUIT AND METHOD FOR ADJUSTING TIMING ALIGNMENT USING PROGRAMMABLE CODES

(75) Inventors: Terence L. Johnson, Fairfax, VA (US); Timothy R. Miller, Arlington, VA (US); Nitin Sharma, Centreville, VA (US)

(73) Assignee: Freescale Semiconductor Inc., Austin, TX (US)

( * ) Notice: Subject to any disclaimer, the term of this patent is extended or adjusted under 35 U.S.C. 154(b) by 609 days.

(21) Appl. No.: 10/990,367

(22) Filed: Nov. 18, 2004

(65) Prior Publication Data

US 2006/0104337 A1    May 18, 2006

(51) Int. Cl.
  *H04L 7/00* (2006.01)
  *H04L 25/00* (2006.01)
  *H04L 25/40* (2006.01)

(52) U.S. Cl. ............... 375/371; 375/149; 375/150; 375/152; 375/343

(58) Field of Classification Search ........... 455/283, 455/284, 295, 296, 301, 303, 3; 375/317, 375/319, 149, 150, 152, 343, 371
See application file for complete search history.

(56) References Cited

U.S. PATENT DOCUMENTS

| | | | | |
|---|---|---|---|---|
| 4,137,427 A | * | 1/1979 | Choquet et al. | ............ 375/355 |
| 4,545,061 A | * | 10/1985 | Hileman | ................ 375/373 |
| 5,963,581 A | * | 10/1999 | Fullerton et al. | ........... 375/131 |
| 6,385,232 B1 | * | 5/2002 | Terashima | ................ 375/149 |
| 6,589,506 B2 | * | 7/2003 | Cremillieux et al. | ........ 424/9.3 |
| 6,965,630 B1 | * | 11/2005 | Miller et al. | ................ 375/130 |
| 7,212,799 B2 | * | 5/2007 | Miller et al. | ................ 455/260 |
| 2005/0175076 A1 | * | 8/2005 | Miller et al. | ................ 375/150 |

* cited by examiner

*Primary Examiner*—Chieh M. Fan
*Assistant Examiner*—Sophia Vlahos (57) ABSTRACT

A method is provided for adjusting timing alignment in which a receiver generates a plurality of imbalanced correction codes (1310), and square waves both having the same frequency. The receiver mixes the imbalanced correction codes with the square waves to create a mixed signal (1320), and integrates the mixed signal over a correction code period to generate a signal power value (1330). The receiver adjusts a phase of the square wave in a first direction when the signal power value satisfies a first criterion (1340, 1350), and in a second direction when the signal power value satisfies a second criterion (1340, 1360). Each imbalanced correction code is symmetrical. And a total integrated value of one of the imbalanced correction codes over the correction code period is either above a first threshold, or below a second threshold, the first threshold being greater than or equal to the second threshold.

20 Claims, 5 Drawing Sheets

CIRCUIT AND METHOD FOR ADJUSTING TIMING ALIGNMENT USING PROGRAMMABLE CODES

CROSS-REFERENCE TO RELATED PATENT DOCUMENTS

This application is related to U.S. application Ser. No. 10/990,400, filed Nov. 18, 2004, entitled "CIRCUIT AND METHOD FOR REDUCING DIRECT CURRENT BIASES", the entire contents of which is hereby incorporated by reference in its entirety.

FIELD OF THE INVENTION

The present invention relates in general to wireless communication systems, such as ultra wideband (UWB) systems, including mobile transceivers, centralized transceivers, related equipment, and corresponding methods. Another aspect of the present invention relates to a wireless transceiver and related method of operation that mixes a square wave into code word to reduce the effects of a DC bias voltage. Another aspect of the present invention relates to a circuit and method in which a programmable correction code is used to allow for efficient timing alignment of the square wave used to reduce the DC bias voltage and a delayed square wave used to extract the original code word from the modulated code word.

BACKGROUND OF THE INVENTION

Digital signal processing (DSP) algorithms for a radio receiver are designed based on a set of presumptions about the signal statistics of a received signal. Most DSP algorithms presume a zero mean signal behavior, i.e., that the signal being processed has a zero DC bias. By assuming zero mean signal behavior, the DSP algorithm complexity can be kept simple, which in turn will keep the hardware implementation of that algorithm simple. As a result, receiver circuits will generally be designed such that they will have a zero DC bias.

However, although the receiver circuit may be designed to avoid a DC bias, such bias voltages can nevertheless arise from circuit mismatches, clock leakages, and other non-ideal aspects of a circuit. These DC bias elements can then serve to reduce overall radio performance by violating the presumptions in the receiver's DSP algorithms.

Thus it is generally desirable to both avoid DC biases and to provide methods to correct them when they inevitably appear. It would therefore be desirable to provide a receiver circuit that can minimize the effect of DC biases in its operation.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Circuit for Adjusting Timing Alignment

Figure 1:
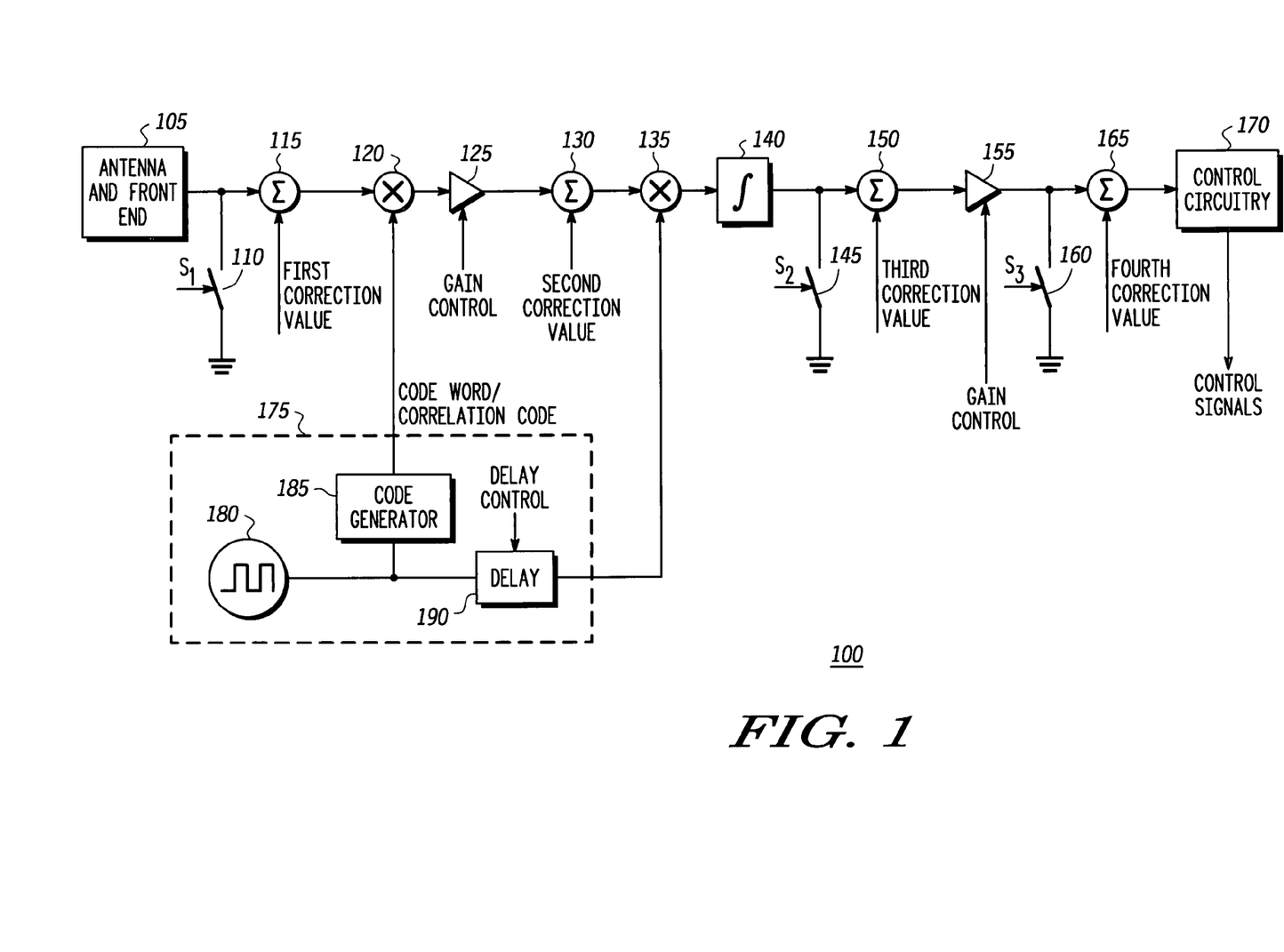
FIG. 1 is a circuit diagram of a system for adjusting timing alignment, according to a disclosed embodiment of the present invention.

FIG. 1 is a circuit diagram of a system for adjusting timing alignment, according to a disclosed embodiment of the present invention. As shown in FIG. 1, the receiving circuit 100 includes an antenna and front end 105, first through third switches 110, 145, and 160, first through fourth summers 115, 130, 150, and 165, first and second mixers 120 and 135, first and second amplifiers 125 and 155, an integrate and hold circuit 140, process and control circuitry 170, a square wave generator 180, a code generator 185, and a delay circuit 190.

In this circuit, the antenna and front end 105 receives a wireless signal and converts it to an incoming signal that it provides to the signal processing stream of the receiving circuit 100. The mixers 120, 135, the amplifiers 125, 155, the integrate and hold circuit 140, and the process and control circuitry 170 process the incoming signal as it passes down the signal processing stream. The first through fourth summers 115, 130, 150, and 165 are provided to introduce bias correction values to reduce DC biases in the circuit. The first through third switches 110, 145, and 160 are provided to isolate portions of the receiving circuit 100 so that proper correction values can be determined.

The first summer 115 receives the incoming signal, e.g., a UWB signal received from the antenna and front end, and adds a first correction value to reduce the DC bias and produce a first corrected signal.

The first mixer 120 receives the incoming signal after it has had the first correction value added to it to reduce DC bias (i.e., it receives the first corrected signal) and mixes it with either a code word or a correction code, depending upon the operational status of the circuit 100, to generate a first mixed signal. When the circuit 100 is in a receive mode, it mixes the first corrected signal with a code word; when the circuit 100 is in a calibration mode, it mixes the first corrected signal with a correction code.

The code word or correction code received by the first mixer 120 is preferably mixed with a square wave having a frequency equal to the frequency of the code word or correction code.

The first amplifier 125 receives and amplifies the first mixed signal. In the disclosed embodiment it is a programmable-gain band pass filter, though other types of amplifiers can be used in alternate embodiments. In addition, in some alternate embodiments the first amplifier 120 could be split up into multiple amplifiers.

The second summer 130 receives the output of the first amplifier 125 and adds a second correction value to further reduce the DC bias and produce a second corrected signal.

The second mixer 135 receives the output of the first amplifier 125 after it has had the first correction value added to it to reduce DC bias (i.e., it receives the second corrected signal) and mixes it with a square wave to generate a second mixed signal.

The integrate and hold circuit 140 integrates the second mixed signal over the length of a code word or correction code and holds this value as an integrated output.

The third summer 150 receives the output of the integrate and hold circuit 140 and adds a third correction value to further reduce the DC bias and produce a third corrected signal.

The second amplifier 155 receives the output of the integrate and hold circuit 140 after it has had the third correction value added to it to reduce DC bias (i.e., it receives the third corrected signal) and amplifies it to produce a second amplified signal. In alternate embodiments the second amplifier 155 could be split up into multiple amplifiers.

The fourth summer 165 receives the output of the second amplifier 155 and adds a fourth correction value to further reduce the DC bias and produce a fourth corrected signal.

The process and control circuitry 170 performs further processing steps on the fourth correction signal. In a receive mode, the process and control circuitry 170 performs the signal processing steps necessary to receive a signal and extract the data from it. In a calibration mode the process and control circuitry 170 calculates and provides the first through fourth correction values based on the fourth corrected signal. In a timing alignment mode the process and control circuitry 170 calculates and provides the delay control signal based on the fourth corrected signal.

The square wave generator 180 generates a square wave at a set square wave frequency. In the disclosed embodiment the square wave generator 180 generates a square wave at the frequency of a code word or a correction code.

The code generator 185 generates code words or a correction codes at a given code frequency. In one embodiment these code words or correction codes are comprised of a plurality of binary- or ternary-encoded wavelets. The wavelets can be any kind of bi-phase wavelets, including repeated cycles of sine waves, bi-phase Gaussian monopulses, rectified sine waves, or the like.

The code words and correction codes generated by the code generator 185 can be set to include any desired number of wavelets. When the DC bias is to be minimized these correction codes can have an even number of wavelets; and when the DC bias is to be maximized the correction codes can have an odd number of wavelets However, any desired length that meets the necessary criteria can be used. In some embodiments, a limited number of operational code words and correction codes may be available. In this case it may be desirable to only use code words/correction codes with even numbers of wavelets. In this case an odd number of codes can be concatenated when a DC bias enhancing code is needed, and this new code can be used as a correction code.

The code word or correction code is then mixed with the square wave generated by the square wave generator 180 and the result is provided to the first mixer 120.

The delay circuit 190 receives the square wave from the square wave generator 180 and delays it to produce a delayed square wave received by the second mixer 135.

The first switch 110 operates in response to a first switch control signal $S_1$ and serves to selectively isolate the first through fourth summers 115, 130, 150, and 165, the first and second mixers 120 and 135, the first and second amplifiers 125 and 155, the integrate and hold circuit 140, the process and process and control circuitry 170, the oscillator 180, the code generator 185, and the delay circuit 190 from the incoming signal.

The second switch 145 operates in response to a second switch control signal $S_2$ and serves to selectively isolate the third and fourth summers 150 and 165, the second amplifier 155, and the process and control circuitry 170 from the integrated signal.

The third switch 160 operates in response to a third switch control signal $S_3$ and serves to selectively isolate the fourth summer 165 and the process and control circuitry 170 from the second amplified signal.

A more detailed disclosure of the methods for setting the correction values is set forth in U.S. application Ser. No. 10/990,400, filed Nov. 18, 2004, entitled "CIRCUIT AND METHOD FOR REDUCING DIRECT CURRENT BIASES," though other methods are possible.

The modulated code word/correction code used in combination with the delayed square wave allows the circuit 100 to better control the effect of the DC bias in the signal path.

If an even code word/correction code is used (i.e., one whose first half and second half both integrate to the same value over half the code word/correction code length), then the modulation of the code word/correction code by the square wave will operate to cancel out effects of a DC bias over one integration interval of the integrate and hold circuit 140 (i.e., the length of a code word/correction code). In this case, half of the code word/correction code (including any DC bias) will be multiplied by a positive square wave voltage and the other half of the code word/correction code (including the DC bias) will be multiplied by a corresponding negative square wave voltage. Because the correction code is even, the DC bias portions in each modulated half of the correction code will be equal in magnitude but opposite in polarity. When integrated over an entire code word/correction code the DC bias portion of each of the two opposite polarity halves will therefore cancel out.

If an odd code word/correction code is used (i.e., one whose first half and second half do not both integrate to the same value over half the code word/correction code length), then the modulation of the code word/correction code by the square wave will operate to enhance the effects of a DC bias over one integration interval of the integrate and hold circuit 140. In this case, half of the code word/correction code (including any DC bias) will be multiplied by a positive square wave voltage and the other half of the code word/correction code (including the DC bias) will be multiplied by a corresponding negative square wave voltage. Because the two halves of the correction code word are not equivalent, when integrated over an entire code word/correction code the DC bias portion of the half with the greater integrated magnitude will exceed the DC bias portion of the half with the lesser integrated magnitude, and a positive or negative bias will remain.

In addition, if an imbalanced code word/correction code is used (i.e., one whose first half and second half are symmetric, and whose first half and second half each do not integrate to zero over half of the code word/correction code length), then the modulation of the code word/correction code by the square wave and the its demodulation by the delayed square wave can be used to adjust the timing of the delayed square wave to a desired position.

As noted above, the output of the code generator 185 is a code word or correction code modulated and derived from the square wave output from the square wave generator 180. Conceptually, the code generator 185 generates a code that is then modulated by the square wave output form the square wave generator 180. In practice, the code generator 185 can be programmed to generate a code in response to the square wave that is equivalent to an initial code modulated by the square wave.

However, alternate embodiments could replace the code generator 185 with a code generator and a third mixer. In such an embodiment the third mixer would receive as inputs a code provided by the code generator and a square wave provided by the square wave generator 180. It would then mix these two to provide a modulated code (i.e., a modulated code word or a modulated correction code).

During a receiving function it will be necessary to perform a demodulation function on the generated code word at some prior to final signal processing to remove the effects of the modulation by the square wave. In order to perform this demodulation, it will be necessary to modulate the signal again by the same sort of square wave.

In the circuit of FIG. 1, the delayed square wave introduced at the second mixer 135 operates to return the code word/correction code to its unmodulated values. In order for it to accomplish this, the delayed square wave should have the same phase as the signal received at the other input of the second mixer 135. In other words, the delayed square wave should coincide with the effect of the original square wave that modulates the code word/correction code in order to restore the signal to what it would have been absent the first modulation (i.e., the positive section of a cycle will multiply with the positive section and the negative section of the cycle will multiply with the negative section).

However, given the delays inherent in the code generator 185, first mixer 120, first amplifier 125 and second summer 130, the square wave output from the square wave generator 180 must be delayed in the delay circuit 190 by a set delay to achieve this timing alignment.

The circuit 100 of FIG. 1 can operate in a number of different modes. These include an operation mode, a bias calibration mode, and a timing alignment mode.

In an operation mode, where the circuit 100 passes a received signal for processing along the signal path so that data can be extracted, it is desirable that the correction code used for this mode minimize the effect of the DC bias. In a bias calibration mode, where the circuit 100 determines the parameters of any DC biases in order to correct for them, it is desirable that the correction code used for this mode maximize the effect of the DC bias. In a timing alignment mode, where the circuit 100 operates to align the inputs of the second mixer 135, it is generally desirable to minimize the effect of the DC bias. It is also desirable in this mode to use an imbalanced correction code is nevertheless desirable.

First Imbalanced Correction Codes

Figure 2:
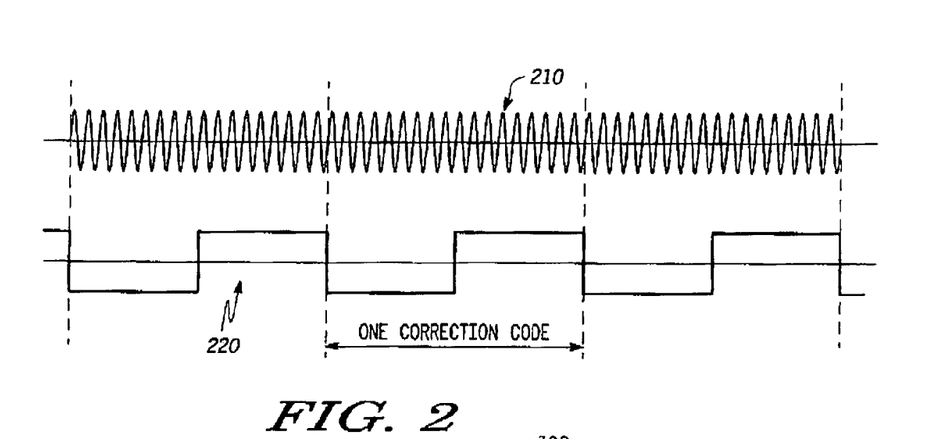
FIG. 2 is a graph of inputs of the second mixer of FIG. 1, according to a disclosed embodiment of the present invention.

FIG. 2 is a graph of inputs of the second mixer of FIG. 1, according to a disclosed embodiment of the present invention. As shown in FIG. 2, the second mixer 135 receives a first input signal 210 and a second input signal 220.

The first input signal 210 is a sinusoidal signal in this disclosed embodiment. Although shown as a repeated sine wave, this is by way of example only. It could, and will in most embodiments, be modulated. It could also be any other kind of periodic signal with a 50% duty cycle. During a timing calibration mode, the first input signal 210 may be the output of the code generator 180 mixed with a DC bias at the first mixer 120.

The second input signal 220 is the delayed square wave output from the delay circuit 190. This square wave has the same frequency as a correction code generated at the code generator 180.

If the first input signal 210 is a balanced signal, as shown in FIG. 2, then it will have any DC bias it contains eliminated when it is mixed at the second mixer 135 with the delayed square wave as the second input signal 220. By multiplying half of the first input signal 210 by a positive portion of the delayed square wave and the other half of the first input signal 210 by the negative half of the delayed square wave, the DC bias components of each half will cancel each other out.

And since the correction code (or code word in some cases) is already derived from the square wave in the code generator 185, when it is then modulated by a properly aligned delayed square wave (which is identical to the original square wave), the result will be the original correlation code (or code word).

Figure 3:
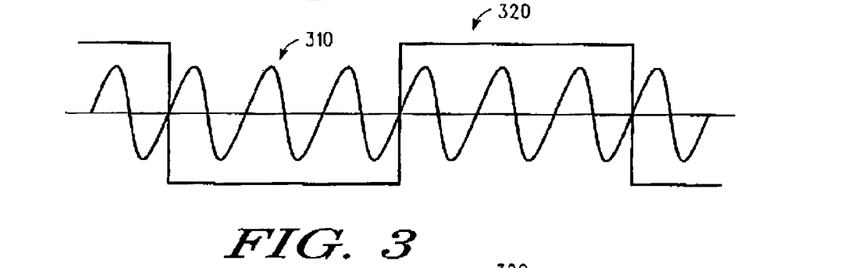
FIGS. 3 through 5 are graphs of the alignment of a balanced correction code and a square wave at the second mixer of FIG. 1, according to a disclosed embodiment of the present invention.
Figure 4:
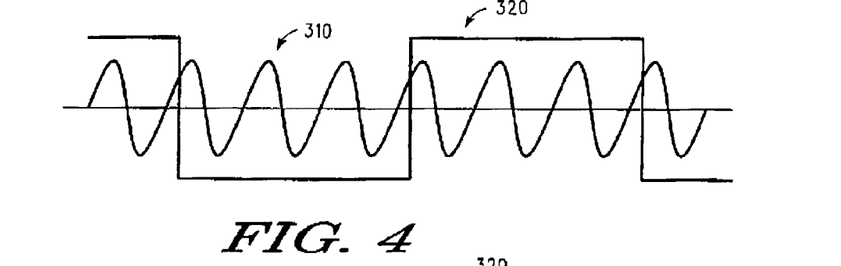
Figure 5:
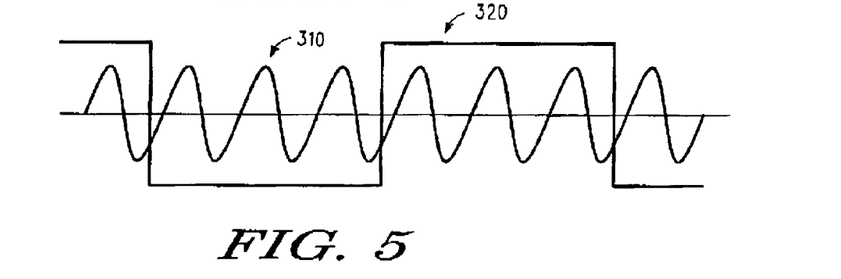

FIGS. 3 through 5 are graphs of the alignment of a balanced correction code and a square wave at the second mixer of FIG. 1, according to a disclosed embodiment of the present invention. By way of example the correction code 310 is shown as being an sinusoidal signal comprising six cycles of a sine wave (i.e, it forms a length 6 code word that is modulated with a value of 111111 onto six wavelets that comprise a single sine wave cycle each). However, in alternate embodiments different binary or ternary modulation values, different code word lengths, and different wavelet shapes can be used.

In particular, FIG. 3 shows a circumstance in which the square wave 320 is perfectly aligned with the correction code 310; FIG. 4 shows a circumstance in which the square wave 320 is slightly later in phase with respect to the correction code 310; and FIG. 5 shows a circumstance in which the square wave 320 is slightly earlier in phase with respect to the correction code 310.

As shown in FIGS. 3 to 5, no matter how the delayed square wave 320 is applied to the balanced correction code 310, it will always provide a resulting signal that will be integrated to zero over a code length. This is because the correction code signal is sinusoidal, and half of the frequency of the square wave 320 is an integral multiple of the frequency of the sine wave that forms correction code signal 310. (The same would be true for any other waveform that was periodic with a 50% duty cycle.) Thus, each portion of the correction code 310 modulated by the square wave 320 will individually integrate to zero, and so the sum of the two will also integrate to zero. This would be true regardless of how the correction code were modulated.

However, since it is desirable to align the correction code 310 and the delayed square wave 320 (as shown in FIG. 3), it would be helpful to have a way to determine when the two signals were out of alignment. This can be achieved by using an imbalanced correction code.

Figure 6:
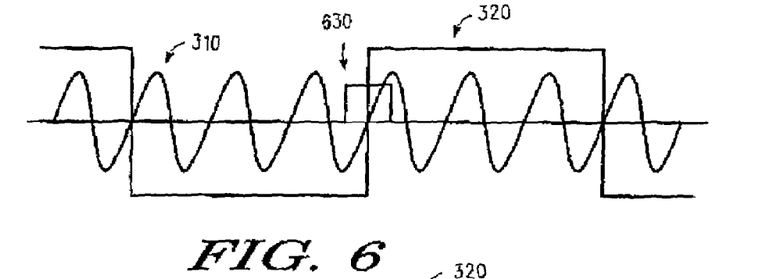
FIGS. 6 through 8 are graphs of the alignment of an imbalanced correction code and a square wave at the second mixer of FIG. 1, according to a disclosed embodiment of the present invention.
Figure 7:
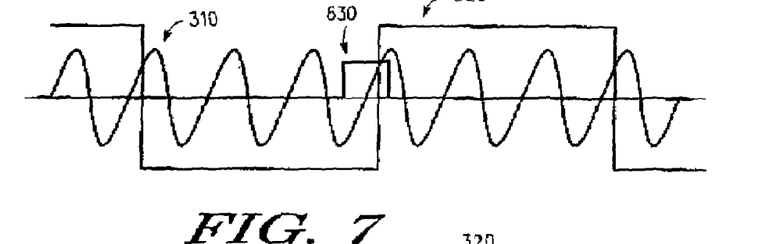
Figure 8:
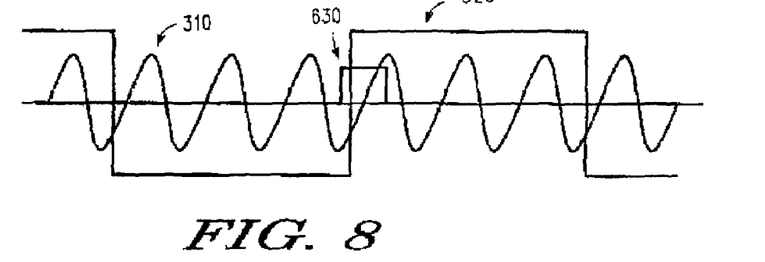

FIGS. 6 through 8 are graphs of the alignment of an imbalanced correction code and a square wave received at the second mixer of FIG. 1, according to a disclosed embodiment of the present invention. By way of example the imbalanced correction code is shown as being made up of a balanced correction code portion 310 plus an imbalanced signal portion 630. The balanced correction code 310 is similar to the one shown in FIGS. 3 through 5, and can be formed as described above. The imbalanced signal portion 630 is a signal that is symmetric around the center of the correction code 310, and whose first and second halves do not either integrate to zero over the half of the correction code length. Although the correction code portion 310 and the imbalanced signal portion 630 are shown as different signals, this is for the purposes of signal analysis only. In practice they would be added together to form one signal. However, by separating these portions it is easy to see how they will be modulated and integrated.

In particular, FIG. 6 shows a circumstance in which the square wave 320 is perfectly aligned with the correction code portion 310; FIG. 7 shows a circumstance in which the square wave 320 is slightly later in phase with respect to the correction code portion 310; and FIG. 8 shows a circumstance in which the square wave 320 is slightly earlier in phase with respect to the correction code portion 310.

As shown in FIGS. 6 to 8, when the delayed square wave 320 is applied to the balanced correction code portion 310, it will result in a signal that integrates to zero. This is because the correction code signal is periodic with a 50% duty cycle, and half of the frequency of the square wave 320 is an integral multiple of the frequency of the sine wave that forms correction code portion 310. Thus, each section of the correction code portion 310 modulated by the square wave 320 will individually integrate to zero, and so the sum of the two will also integrate to zero. This would be true regardless of how the correction code were modulated.

However, when the imbalanced signal portion 630 is modulated by the delayed square wave 320, the resulting modulated signal will integrate to different values depending upon the alignment of the correction code portion 310 and the square wave 320.

Figure 9:
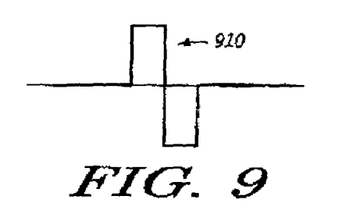
FIGS. 9 through 11 are graphs of the results of mixing a delayed square wave with imbalanced signal portions of the imbalanced correction code of FIGS. 6 through 8, respectively, according to a disclosed embodiment of the present invention.
Figure 10:
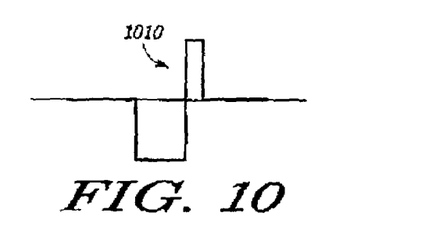
Figure 11:
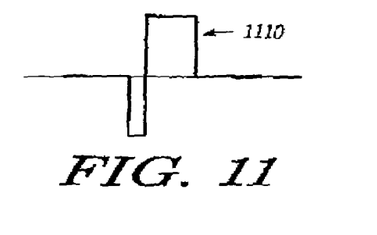

FIGS. 9 through 11 are graphs of the results of mixing a delayed square wave with imbalanced signal portions of the imbalanced correction code of FIGS. 6 through 8, respectively, according to a disclosed embodiment of the present invention.

As shown in FIG. 9, when the delayed square wave 320 is perfectly aligned with the correction code portion 310, its clock edge will be perfectly aligned with the center of the imbalanced signal portion 630 (which is symmetric with respect to the correction code portion 310). Thus, when the delayed square wave 320 modulates the imbalanced signal portion 630, half of the imbalanced signal portion 630 will be multiplied by a negative square wave voltage and half by a positive square wave voltage. This will render a modulated imbalanced signal portion 910 that will integrate to zero over the period of one correction code 310.

As shown in FIG. 10, when the delayed square wave 320 is slightly later in phase with respect to the correction code portion 310, its clock edge will align with a point after the line of symmetry in the imbalanced signal portion 630. Thus, when the delayed square wave 320 modulates the imbalanced signal portion 630, a larger portion of the imbalanced signal portion 630 will be multiplied by a negative square wave voltage and a smaller portion of the imbalanced signal portion 630 will be multiplied by a positive square wave voltage. The resulting modulated imbalanced signal portion 1010 that will integrate to a negative value over the period of one correction code 310.

As shown in FIG. 11, when the delayed square wave 320 is slightly earlier in phase with respect to the correction code portion 310, its clock edge will align with a point before the line of symmetry in the imbalanced signal portion 630. Thus, when the delayed square wave 320 mixes against the imbalanced signal portion 630, a smaller portion of the imbalanced signal portion 630 will be multiplied by a negative square wave voltage and a larger portion of the imbalanced signal portion 630 will be multiplied by a positive square wave voltage. The resulting imbalanced signal portion 1110 that will integrate to a positive value over the period of one correction code 310.

Thus, by adding the imbalanced signal portion, the control circuitry 170 can determine whether the delayed square wave input to the second mixer 135 is properly aligned with the other input of the second mixer 135 by looking at the integrated value output from the integrate and hold circuit 140. Furthermore, by looking at the polarity of the output of the integrate and hold circuit 140, the control circuitry 170 can determine how to adjust the delay control signal to the delay circuit 190 to properly adjust the phase of the delayed square wave. If the output of the integrate and hold circuit 140 is effectively zero, then the delayed square wave is properly aligned. If the output of the integrate and hold circuit 140 is of one polarity (negative in the disclosed embodiment), then the delayed square wave should have its phase reduced. And if the output of the integrate and hold circuit 140 is of the other polarity (positive in the disclosed embodiment), then the delayed square wave should have its phase advanced.

When examining the value of a signal, it can be determined to be effectively zero when its value is above a set negative zero threshold and below a set positive zero threshold. These thresholds can account for the imperfections in a real circuit that will make a true zero voltage impossible. For the purposes of this disclosure, however, it is assumed that when a signal is described as having a value of "zero," it is actually effectively zero, accounting for minor variations in voltage. In other embodiments a closest-to-zero routine can be used to determine an effective "zero" value in which a transition of the sign of the voltage signal is monitored to determine when the signal reaches zero voltage.

FIGS. 6 through 8 disclose an imbalanced correction code formed by the addition of a balanced correction code portion 310 and an imbalanced signal portion 630. However, in alternate embodiments the balanced correction code portion 310 can be omitted and only an imbalanced signal portion 630 can be generated.

Although FIGS. 3 through 8 show sinusoidal signals used to form the correction codes, alternate embodiments any periodic signal with a 50% duty cycle could be used, e.g., square waves, saw-toothed waves, etc.

Second Imbalanced Correction Codes

Figure 12:
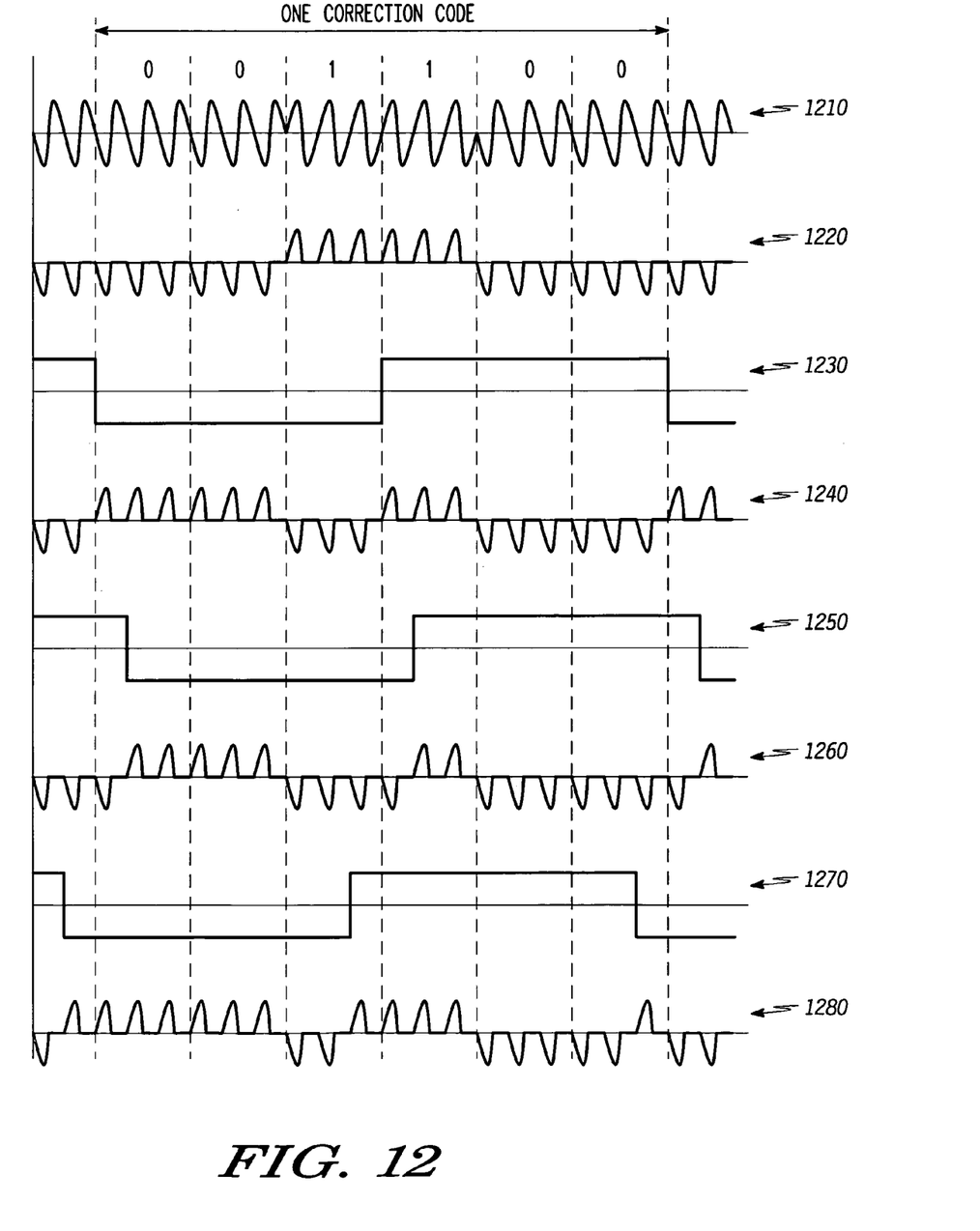
FIG. 12 is a graph of the inputs and outputs of the second mixer of FIG. 1 using a rectified imbalanced correction code, according to a disclosed embodiment of the present invention.

FIG. 12 is a graph of the inputs and outputs of the second mixer of FIG. 1 using a rectified imbalanced correction code, according to a disclosed embodiment of the present invention. As shown in FIG. 12, the first input signal 1220 of the second mixer 135 is effectively the signal output from the code generator 185 (i.e., the modulated correction code). This is because during the timing alignment process no incoming data signals are being passed to the first mixer 120. The second input signal 1230, 1250, 1270 of the second mixer 135 is the delayed square wave output from the delay circuit 170. FIG. 12 shows three different positions of the second input signal: an on-time second input signal 1230, a late-phase second input signal 1250, and an early-phase second input signal 1270.

The first input signal 1220 is based on a modulated correction code 1210 that is binary encoded with a value of 001100, with a non-inverted wavelet forming a digital "1" and an inverted wavelet forming a digital "0." In alternate embodiments the ternary encoding can be employed in which a non-inverted wavelet represents a "1," an inverted wavelet represents a "−1," and a null wavelet represents a "0." The modulated correction code 1210 in FIG. 12 is a code of length six, with each wavelet in the code being formed of three cycles of a sine wave.

The code value for the first input signal 1220 is chosen to match the requirements of the imbalanced portion of FIGS. 6 to 9. In other words, it must be symmetrical around the center of the code length and each half cannot give a value of zero when integrated over half the code length.

As noted above, the modulated correlation code 1210 is actually a correlation code formed in the code generator 185 that is derived from the square wave output from the square wave generator 180. This code is conceptually an initial code modulated by the square wave. However, as noted above, in practice, the code generator 185 may simply create the modulated code directly based on the square wave.

In this disclosed embodiment in which the square wave leads with its negative edge, the effective correlation code that would be generated by the code generator 185 prior to modulation by the square wave would be 110100. And it is this demodulated code that will be output from the second mixer 135.

In this disclosed embodiment the modulated correction code 1210 is rectified into a rectified correlation code 1220 before it is output from the code generator 185. In the rectification process any wavelet that has a value of "1" has its negative portions removed, and any wavelet that has a value of "0" has its positive portions removed. In alternate embodiments the reverse could be done with the opposite portions removed for each digital value. Also, in ternary embodiments wavelets with a value of "1" can have one polarity recitified out (positive or negative), wavelets with a value of "−1" can have the other polarity recitified out, and wavelets with a value of "0" remain unchanged.

FIG. 12 shows three different output signals for the second mixer 135: an on-time output signal 1240 when the first input signal 1220 is mixed with an on-time second input signal 1230; a late-phase output signal 1260 when the first input signal 1220 is mixed with a late-phase second input signal 1250, and an early-phase output signal 1280 when the first input signal 1220 is mixed with an early-phase second input signal 1270. The rectified.

As shown in FIG. 12, the on-time output signal 1240 integrates to a value of zero over the length of the code (i.e., it has an equal number of positive pulses and negative pulses within the period of one code). The late-phase output signal 1260 integrates to a negative value over the length of the code (i.e., it has fewer positive pulses than negative pulses within the period of one code). And the early-phase output signal 1280 integrates to a positive value over the length of the code (i.e., it has more positive pulses than negative pulses within the period of one code).

Thus, by looking at the polarity of the output of the integrate and hold circuit 140, the control circuitry 170 can determine how to adjust the delay control signal to the delay circuit 190 to properly adjust the phase of the delayed square wave 1230, 1250, 1270. If the output of the integrate and hold circuit 140 is zero, then the delayed square wave 1230 is properly aligned. If the output of the integrate and hold circuit 140 is of one polarity (negative in the disclosed embodiment) and is not minimized, then the delayed square wave 1250 should have its phase reduced. And if the output of the integrate and hold circuit 140 is of the other polarity (positive in the disclosed embodiment), then the delayed square wave 1270 should have its phase advanced.

Although in FIGS. 2 through 12 the delayed square waves are shown as having a negative value at the beginning of the code word/correction code period, and a positive value at the end of the code word/correction code period alternate embodiment could reverse this.

Method of Adjusting Timing Alignment

Figure 13:
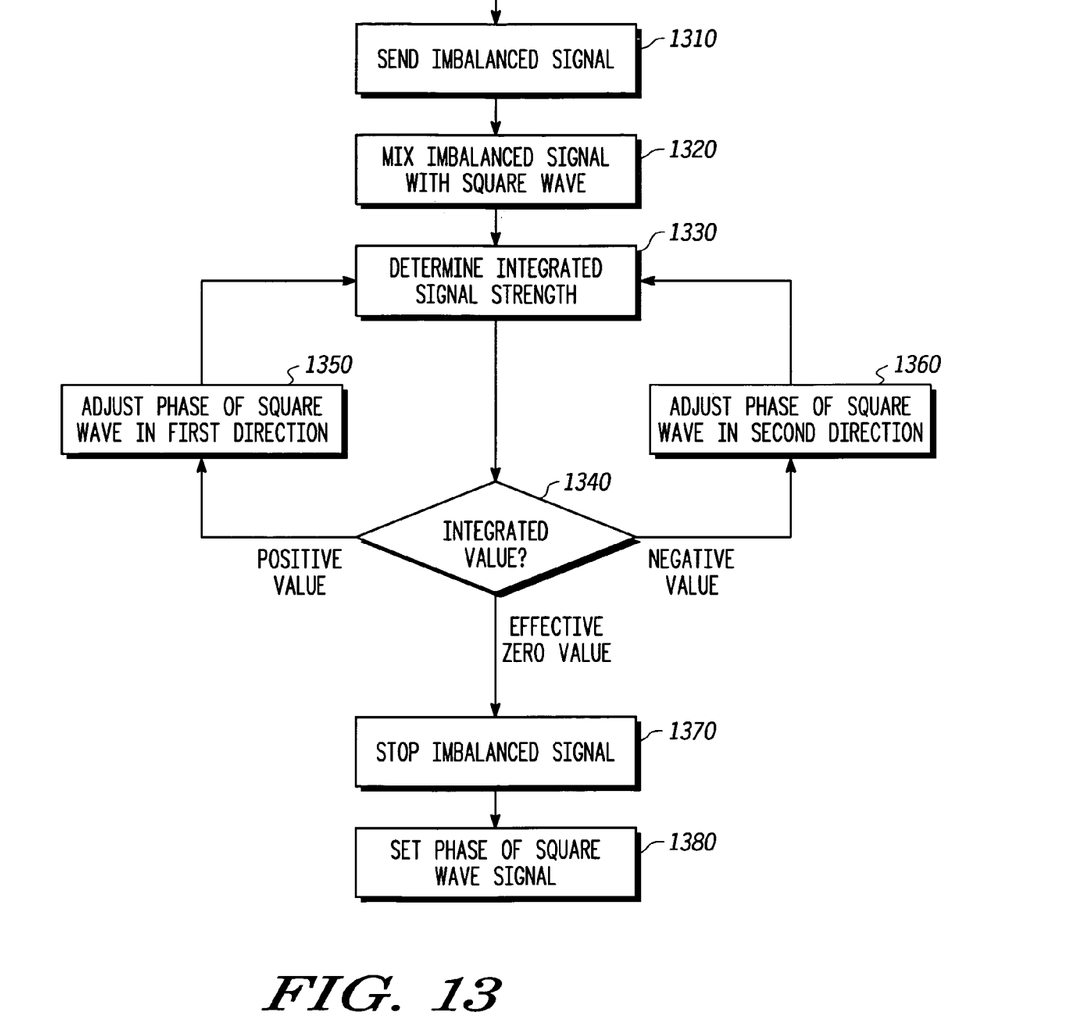
FIG. 13 is a flow chart showing a method of adjusting the timing alignment of the delayed square wave input to the second mixer of FIG. 1, according to disclosed embodiments of the present invention.

FIG. 13 is a flow chart showing a method of adjusting the timing alignment of the delayed square wave input to the second mixer of FIG. 1, according to disclosed embodiments of the present invention.

As shown in FIG. 13 the process begins when the code generator 185 generates an imbalanced modulated correction code. (Step 1310) This imbalanced modulated correction code will pass through the first mixer 120, the first amplifier 125, and the second summer 130 and will ultimately become the first input at the second mixer 135.

The imbalanced modulated correction code is then mixed with the delayed square wave, which is provided as the second input at the second mixer 135. (Step 1320)

The output of the second mixer 135 is then integrated by the integrate and hold circuit 140 to determine the signal strength of the second mixed signal over the length of the code. (Step 1330)

The polarity of the integrated value output from the integrate and hold circuit 140 is then evaluated to determine how the timing of the delayed square wave should be adjusted (i.e., how to adjust the delay control signal to the delay circuit 190). (Step 1340)

If the output of the integrate and hold circuit 140 has a positive value, the phase of the delayed square wave should be adjusted in a first direction (forward in the disclosed embodiment). (Step 1350)

If the output of the integrate and hold circuit 140 has a negative value, the phase of the delayed square wave should be adjusted in a first direction (backward in the disclosed embodiment). (Step 1360)

If, however, the output of the integrate and hold circuit 140 has a zero value, the phase of the delayed square wave is correct and the imbalanced signal can be stopped. (Step 1370) At this stage the proper phase of the delayed square wave signal can be set by providing the corresponding delay control signal to the delay circuit 190. (Step 1380)

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for adjusting timing alignment in a wireless receiver, comprising:
   generating an imbalanced correction code signal comprising a plurality of imbalanced correction codes;
   generating a first square wave signal having a square wave frequency equal to a correction code frequency of the unbalanced correction codes in the imbalanced correction code signal;
   mixing the imbalanced correction code signal with the first square wave signal to create a first mixed signal;
   integrating the first mixed signal over a correction code period to generate a signal power value;
   adjusting a phase of the first square wave in a first direction when the signal power value satisfies a first criterion; and
   adjusting the phase of the first square wave in a second direction when the signal power value satisfies a second criterion,
   wherein the plurality of imbalanced correction codes are formed such that:
      each imbalanced correction code is symmetrical, and
      a total integrated value or one of the imbalanced correction codes over the correction code period is one of: above a first threshold, or below a second threshold, the first threshold being greater than or equal to the second threshold.

2. A method for adjusting timing alignments in a wireless receiver, as recited in claim 1, wherein the first and second thresholds are both zero.

3. A method for adjusting timing alignments in a wireless receiver, as recited in claim 1, wherein the step of generating an imbalanced correction code signal further comprises:
   generating an initial correction code signal comprising a plurality of initial correction codes;
   generating a second square wave having the square wave frequency; and
   multiplying the initial correction code signal with the second square wave to generate the imbalanced correction code signal.

4. A method for adjusting timing alignments in a wireless receiver, as recited in claim 1,
   wherein the first criterion is satisfied when the signal power value is above a third threshold,
   wherein the second criterion is satisfied when the signal power value is below a fourth threshold, and
   wherein the third threshold is greater than or equal to the fourth threshold.

5. A method for adjusting timing alignments in a wireless receiver, as recited in claim 4, wherein the third and fourth thresholds are both zero.

6. A method for adjusting timing alignments in a wireless receiver, as recited in claim 1,
   wherein the first criterion is satisfied when a sign of the signal power value passes from negative to positive, and
   wherein the second criterion is satisfied when the sign of the signal power value passes from positive to negative.

7. A method for adjusting timing alignments in a wireless receiver, as recited in claim 1, wherein each of the plurality of imbalanced correction codes comprises a plurality of positive signal portions and a plurality of negative signal portions.

8. A method for adjusting timing alignments in a wireless receiver, as recited in claim 7,
   wherein the positive signal portions are one of: positively-justified sine wave portions, positively-justified bi-phase Gaussian wavelet portions, positively-justified square wave portions, and positively-justified saw wave portions, and
   wherein the negative signal portions are one of: negatively-justified sine wave portions, negatively-justified bi-phase Gaussian wavelet portions, negatively-justified square wave portions, and negatively-justified saw wave portions.

9. A method for adjusting timing alignments in a wireless receiver, as recited in claim 7, wherein the plurality of positive signal portions is greater in number than the plurality of negative signal portions.

10. A method for adjusting dining alignments in a wireless receiver, as recited in claim 7, wherein the plurality of positive signal portions is smaller in number than the plurality of negative signal portions.

11. A method for adjusting timing alignments in a wireless receiver, as recited in claim 1, wherein the method is implemented in an integrated circuit.

12. A method for adjusting timing alignments in a wireless receiver, as recited in claim 1, wherein the method is implemented in an ultra wideband device.

13. A method for adjusting timing alignments in a wireless receiver, as recited in claim 1, wherein the steps of mixing the imbalanced correction code signal with the first square wave signal, integrating the first mixed signal over the correction code period, adjusting the phase of the first square wave in the first direction when the signal power value satisfies the first criterion, and adjusting the phase of the first square wave in the second direction when the signal power value satisfies the second criterion, are repeated until the square wave is aligned with the imbalanced correction code signal such that one cycle of the first square wave signal is substantially aligned with one of the imbalanced correction codes.

14. A circuit for adjusting timing alignments in a wireless receiver, comprising:
   a square wave generator for generating a base square wave at a code frequency;
   a code generator for generating an unbalanced correction code at the code frequency in response to the base square wave;
   a delay circuit for delaying the base square wave by a delay time to create a delayed square wave;
   a mixer for multiplying the imbalanced correction code and the delayed square wave to create a first mixed signal;
   an integrate and hold circuit for integrating the mixed signal over a code period to create a signal power value; and
   a control circuit for setting the delay time based on the signal power value,
   wherein the imbalanced correction code is symmetrical, and
   a total integrated value of the imbalanced correction codes over the code period is one of: above a first threshold, or below a second threshold, the first threshold being greater than or equal to the second threshold.

15. A circuit for adjusting timing alignments in a wireless receiver, as recited in claim 14,
   wherein the control circuit increases the delay time when the signal power value satisfies a first criterion; and wherein the control circuit decreases the delay time when the signal power value satisfies a second criterion.

16. A circuit for adjusting timing alignments in a wireless receiver, as recited in claim 14, wherein the first and second thresholds are both zero.

17. A circuit for adjusting timing alignments in a wireless receiver, as recited in claim 14,
wherein the first criterion is satisfied when the signal power value is shove a third threshold,
wherein the second criterion is satisfied when the signal power value is below a fourth threshold, and
wherein the third threshold is greater than or equal to the fourth threshold.

18. A circuit for adjusting timing alignments in a wireless receiver, as recited in claim 14,
wherein the first criterion is satisfied when a sign of the signal power value passes from negative to positive, and
wherein the second criterion is satisfied when the sign of the signal power value passes from positive to negative.

19. A circuit for adjusting timing alignments in a wireless receiver, as recited in claim 14, wherein the circuit is implemented in an integrated circuit.

20. A circuit for adjusting timing alignments in a wireless receiver, as recited in claim 14, wherein the circuit is implemented in an ultra wideband device.

* * * * *

UNITED STATES PATENT AND TRADEMARK OFFICE
CERTIFICATE OF CORRECTION

| | | |
|---|---|---|
| PATENT NO. | : 7,362,840 B2 | Page 1 of 1 |
| APPLICATION NO. | : 10/990367 | |
| DATED | : November 18, 2004 | |
| INVENTOR(S) | : Terence L. Johnson | |

It is certified that error appears in the above-identified patent and that said Letters Patent is hereby corrected as shown below:

In Column 11, Line 11, Claim No. 1:

Change "the unbalanced correction codes" to --the imbalanced correction codes--

In Column 11, Line 26, Claim No. 1:

Change "a total integrated value or one of the imbalanced" to --a total integrated value of one of the imbalanced--

In Column 12, Line 44, Claim No. 14:

Change "a code generator for generating an unbalanced correction" to --a code generator for generating an imbalanced correction--

In Column 13, Line 9, Claim No. 17:

Change "power value is shove a third threshold," to --power value is above a third threshold,--

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,362,840 B2  
APPLICATION NO. : 10/990367  
DATED : April 22, 2008  
INVENTOR(S) : Terence L. Johnson Page 1 of 1

It is certified that error appears in the above-identified patent and that said Letters Patent is hereby corrected as shown below:

In Column 11, Line 11, Claim No. 1:

Change "the unbalanced correction codes" to --the imbalanced correction codes--

In Column 11, Line 26, Claim No. 1:

Change "a total integrated value or one of the imbalanced" to --a total integrated value of one of the imbalanced--

In Column 12, Line 44, Claim No. 14:

Change "a code generator for generating an unbalanced correction" to --a code generator for generating an imbalanced correction--

In Column 13, Line 9, Claim No. 17:

Change "power value is shove a third threshold," to --power value is above a third threshold,--

This certificate supersedes the Certificate of Correction issued July 29, 2008.

Signed and Sealed this

Twenty-sixth Day of August, 2008

JON W. DUDAS  
*Director of the United States Patent and Trademark Office*